US012250160B2

(12) United States Patent
Alabiso et al.

(10) Patent No.: US 12,250,160 B2
(45) Date of Patent: *Mar. 11, 2025

(54) PROVISIONING OF RESOURCES (71) Applicant: International Business Machines Corporation, Armonk, NY (US)

(72) Inventors: Francoise Alabiso, Montpellier (FR); Olivier Boehler, Montpellier (FR); Michael C. Buzzetti, Poughkeepsie, NY (US); Frank J. De Gilio, Poughkeepsie, NY (US); Sebastien Llaurency, Lunel (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1455 days.

This patent is subject to a terminal disclaimer.

(21) Appl. No.: 15/471,526

(22) Filed: Mar. 28, 2017

(65) Prior Publication Data

US 2017/0201465 A1  Jul. 13, 2017

Related U.S. Application Data

(63) Continuation of application No. 14/239,891, filed as application No. PCT/IB2012/055026 on Sep. 21, 2012, now Pat. No. 9,628,402.

(30) Foreign Application Priority Data

Sep. 22, 2011  (EP) .................................. 11290428

(51) Int. Cl.
*H04L 47/722* (2022.01)
*G06F 9/50* (2006.01)
(Continued)

(52) U.S. Cl.
CPC .......... *H04L 47/722* (2013.01); *G06F 9/5027* (2013.01); *H04L 41/0806* (2013.01);
(Continued)

(58) Field of Classification Search
CPC ............... H04L 47/722; H04L 41/0806; H04L 41/5051; H04L 41/5054; H04L 47/70;
(Continued)

(56) References Cited

U.S. PATENT DOCUMENTS 7,328,264 B2  2/2008  Babka
7,478,361 B2  1/2009  Peteanu et al.
(Continued)

FOREIGN PATENT DOCUMENTS

CN  101017444 A  8/2007
CN  101309208 A  11/2008
(Continued)

OTHER PUBLICATIONS

PCT Int'l. Appln. No. IB2012/055026, International Search Report and Written Opinion, Feb. 28, 2013, 8 pg.
(Continued)

*Primary Examiner* — Cheikh T Ndiaye
*Assistant Examiner* — Ayele F Woldemariam
(74) *Attorney, Agent, or Firm* — CUENOT, FORSYTHE & KIM, LLC (57) ABSTRACT

Reservation of resources for a service includes receiving a request for resources for a project duration with a start time and an end time; determining if the requested resources are available for the project duration; determining a utilization level of one or more resource provisioning components during a provisioning time prior to the start time of the project; and determining if the one or more resource provisioning components have capacity to handle the provisioning of resources for the request prior to the start time of the
(Continued)

project. The one or more resource provisioning components can be reserved for a provisioning time prior to the start time of the project.

15 Claims, 9 Drawing Sheets

(51) Int. Cl.
| | |
|---|---|
| *H04L 41/0806* | (2022.01) |
| *H04L 41/5051* | (2022.01) |
| *H04L 41/5054* | (2022.01) |
| *H04L 47/70* | (2022.01) |
| *H04L 67/10* | (2022.01) |

(52) U.S. Cl.
CPC ...... *H04L 41/5051* (2013.01); *H04L 41/5054* (2013.01); *H04L 47/70* (2013.01); *H04L 67/10* (2013.01); *G06F 2209/501* (2013.01); *G06F 2209/5014* (2013.01)

(58) Field of Classification Search
CPC . H04L 67/10; G06F 9/5027; G06F 2209/501; G06F 2209/5014
USPC .......................................................... 709/226
See application file for complete search history.

(56) References Cited

U.S. PATENT DOCUMENTS

| | | | | |
|---|---|---|---|---|
| 8,190,744 | B2* | 5/2012 | Greene | .................. G06Q 10/10 |
| | | | | 709/226 |
| 8,209,695 | B1* | 6/2012 | Pruyne | .................. G06F 9/5077 |
| | | | | 709/226 |
| 8,560,671 | B1* | 10/2013 | Yahalom | ............. H04L 67/1097 |
| | | | | 709/224 |
| 2004/0215780 | A1 | 10/2004 | Kawato | |
| 2007/0143767 | A1 | 6/2007 | Attanasio et al. | |
| 2007/0157016 | A1 | 7/2007 | Dayan et al. | |
| 2007/0220147 | A1 | 9/2007 | Armstrong et al. | |
| 2008/0059610 | A1 | 3/2008 | Lin et al. | |
| 2008/0104245 | A1 | 5/2008 | Romero | |
| 2009/0177775 | A1* | 7/2009 | Radia | .................. H04L 12/6418 |
| | | | | 709/226 |
| 2010/0082812 | A1 | 4/2010 | Brady et al. | |
| 2010/0191881 | A1* | 7/2010 | Tauter | .................... G06Q 10/06 |
| | | | | 710/104 |
| 2011/0022812 | A1 | 1/2011 | Van Der Linden et al. | |
| 2011/0179162 | A1* | 7/2011 | Mayo | .................. H04L 29/0809 |
| | | | | 718/1 |
| 2013/0227127 | A1* | 8/2013 | Takano | ................. G06F 9/5044 |
| | | | | 709/224 |
| 2014/0215080 | A1 | 7/2014 | Alabiso et al. | |

FOREIGN PATENT DOCUMENTS

| | | |
|---|---|---|
| CN | 102103522 A | 6/2011 |
| WO | 2013042078 A1 | 3/2013 |

OTHER PUBLICATIONS

Qi, L. et al., "HAND: Highly Available Dynamic Deployment Infrastructure for Globus Toolkit 4," In 15th Euromicro Int'l. Conf. on Parallel, Distributed and Network-Based Processing, PDP'07, IEEE, pp. 155-162, 2007 [retrieved Feb. 20, 2014] retrieved from the Internet: <http://pdf.aminer.org/000/534/651/hand_highly_available_dynamic_deployment_infrastructure_for_globus_toolkit.pdf>, 10 pg.

Sahai, A. et al., "Automated Generation of Resource Configurations Through Policies," In IEEE Int'l. Workshop on Policies for Distributed Systems and Networks, 2004 [retrieved Feb. 20, 2014] retrieved from the Internet: <http://shiftleft.com/mirrors/www.hpl.hp.com/techreports/2004/HPL-2004-55.pdf>, 14 pg.

U.S. Appl. No. 14/239,891, Non-Final Office Action, Nov. 10, 2015, 9 pg.

U.S. Appl. No. 14/239,891, Final Office Action, Mar. 31, 2016, 9 pg.

U.S. Appl. No. 14/239,891, Notice of Allowance, Dec. 12, 2015, 13 pg.

U.S. Appl. No. 14/239,891, Corrected Notice of Allowance, Dec. 30, 2015, 9 pg.

* cited by examiner

PROVISIONING OF RESOURCES

CROSS-REFERENCE TO RELATED APPLICATIONS

This application is the national stage of PCT/IB2012/055026 filed Sep. 21, 2012, designating, inter alia, the United States and claiming priority to European Patent Application No. 11290428.9 dated Sep. 22, 2011, each of which is incorporated herein by reference in its entirety.

BACKGROUND

During a service offering, the end user can book several services from a service catalog. This service request is pushed to a provisioning engine in order to deploy the appropriate infrastructure and resources. This provisioning requires the utilization of Managed Through Servers (MTS), like Hardware Management Consoles, Operating System Boot servers, etc.

The MTS each have a particular configuration with their own characteristics and parameters to handle a limited number of deployments towards clients. This restriction leads to constraints and errors in the end to end service delivery, thus impacting the customer satisfaction. Another problem encountered with MTS is linked to the reservation setup time which is conventionally fixed for any deployment.

In current reservation mechanisms, there may be more deployments requested than the maximum number the MTS can handle. For example, in cloud computing environments, this could lead to a considerable additional time for a service delivery or to not enough time for the entire deployment. This has an impact on the end user as the service may still be not available due to the extended provisioning time required at the MTS level.

Therefore, there is a need in the art to address the aforementioned problem.

SUMMARY

A method for reservation of resources for a service includes receiving a request for resources for a project duration with a start time and an end time, determining, using a processor, if the requested resources are available for the project duration, determining a utilization level of one or more resource provisioning components during a provisioning time prior to the start time of the project, and determining if the one or more resource provisioning components have capacity to handle the provisioning of resources for the request prior to the start time of the project. The method further includes reserving the one or more resource provisioning components for a provisioning time prior to the start time of the project.

A system includes a processor programmed to initiate executable operations for reservation of resources for a service. The executable operations include receiving a request for resources for a project duration with a start time and an end time, determining if the requested resources are available for the project duration, determining a utilization level of one or more resource provisioning components during a provisioning time prior to the start time of the project, and determining if the one or more resource provisioning components have capacity to handle the provisioning of resources for the request prior to the start time of the project. The executable operations also include reserving the one or more resource provisioning components for a provisioning time prior to the start time of the project.

A computer program product for reservation of resources for a service includes a computer readable storage medium having program code stored thereon. The program code executable by a processor to perform a method. The method includes receiving, using the processor, a request for resources for a project duration with a start time and an end time, determining, using the processor, if the requested resources are available for the project duration, determining, using the processor, a utilization level of one or more resource provisioning components during a provisioning time prior to the start time of the project, and determining if the one or more resource provisioning components have capacity to handle the provisioning of resources for the request prior to the start time of the project using the processor. The method further includes reserving, using the processor, the one or more resource provisioning components for a provisioning time prior to the start time of the project.

BRIEF DESCRIPTION OF THE SEVERAL VIEWS OF THE DRAWINGS

Embodiments of the invention will now be described, by means of example only, with reference to the accompanying drawings in which.

DETAILED DESCRIPTION

Embodiments of the present invention relate to the field of provisioning of resources in a distributed networking system. More particularly, embodiments of the present invention provide a system and a method for provisioning of resources for service offerings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the embodiments of the invention. However, it will be understood by those skilled in the art that the present invention may be practiced without these specific details. In other instances, well-known methods, procedures, and components have not been described in detail so as not to obscure the embodiments of the present invention.

The described method and system provide a bridge between a reservation mechanism and the resource provisioning components' layer to take into account the availability of the resource provisioning components during resource reservation. Resource provisioning components are referred to generally as Managed Through Servers (MTS). An MTS is a component sitting in between a management server and a managed server (provisioned server). An MTS has a view of the real infrastructure status (number of partitions created, their characteristics') and can be used to provision an Operating System or to create/delete/modify a Virtual Machine definition. The term MTS may include hardware management consoles, operating boot servers (for example a Network Installation Manager for provisioning an AIX Operating System). (NIM). The described method and system may include an intelligent workflow in a reservation process in order to also reserve the required availably of an MTS during the provisioning or de-provisioning phases.

The described reservation component takes into account during the reservation process the capacity of the required components used to provide a service and not just, like conventional mechanisms, a resource pool capacity.

Figure 1A:
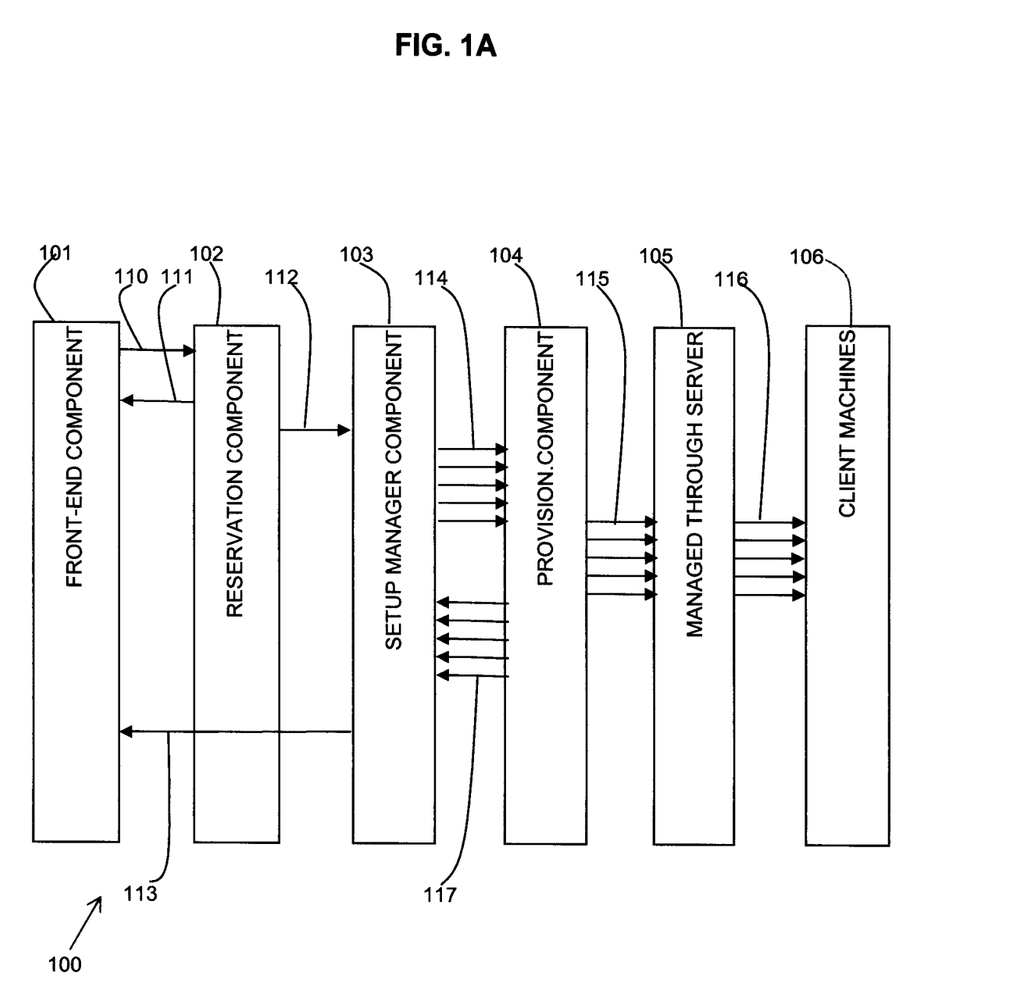
FIGS. 1A and 1B are block diagrams showing an embodiment of a provisioning system in accordance with the present invention.

Referring to FIG. 1, an embodiment of the described reservation and provisioning system 100 is shown.

A front end component 101 may be used by an end user of a service to book resources available from a pool of client machines 106. For example, the client machines 106 may be cloud-computing resources, distributed resources, etc.

A reservation component 102 may receive a reservation request 110 (for example, for a project with 5 resources) from the front end component 101 and may confirm 111 the reservation. The reservation component 102 may create a project sequence file 112 which may be sent to a setup manager component 103. The setup manager component 102 may confirm a project status 113 to the front end component 101.

The setup manager component 103 may make the required calls 114 to a provisioning component 104 which may, for example, create 115 servers at a managed through server 105 (for example, a hardware management console, an operating boot server, etc.). The managed through server 105 may load 116 operating systems on to the required client machines 106. The provisioning component 104 may confirm work done 117 to the setup manager component 103 which may be reported in the project status 113 to the front end component 101.

The described reservation component 102 includes functionality to reserve provisioning capability of a managed through server 105 as well as to reserve client machines 106.

For example, a provisioning and de-provisioning workflow may involve the following which is carried out by the resource provisioning components. The workflows require capacity by the resource provisioning components. The described method and system check and reserve such ensuring the resource provisioning components can handle a reservation request.

Provisioning:
Seq
(
  TpmSoapCommandExec(name=Odina.DynamicTemplate, duration=00: 10:00),
  Wait(duration=00:01:00),
  TpmSoapCommandExec(name=findParameterValue, duration=00:00:45),
  Wait(duration=00: 01: 00), -continued TpmSoapCommandExec(name=  HostPlatform.CreateVirtual-
Server,
duration=00:30:00),
  Wait(duration=00:03:00),
  TpmSoapCommandExec(name=  getDCMObjectIDFromServerName,
duration=00:00:20),
  Wait(duration=00 :02:00),
  OdinaSendMail(subject=provEnd, text=provEnd, to=owner, duration= 00:00:10)
)
De-provisioning:
Seq
(
  TpmSoapCommandExec(name=HostPlatform.DestroyVirtualServer,
duration=00:00:20),
  Wait(duration=00: 01 : 00)
)

Figure 1B:
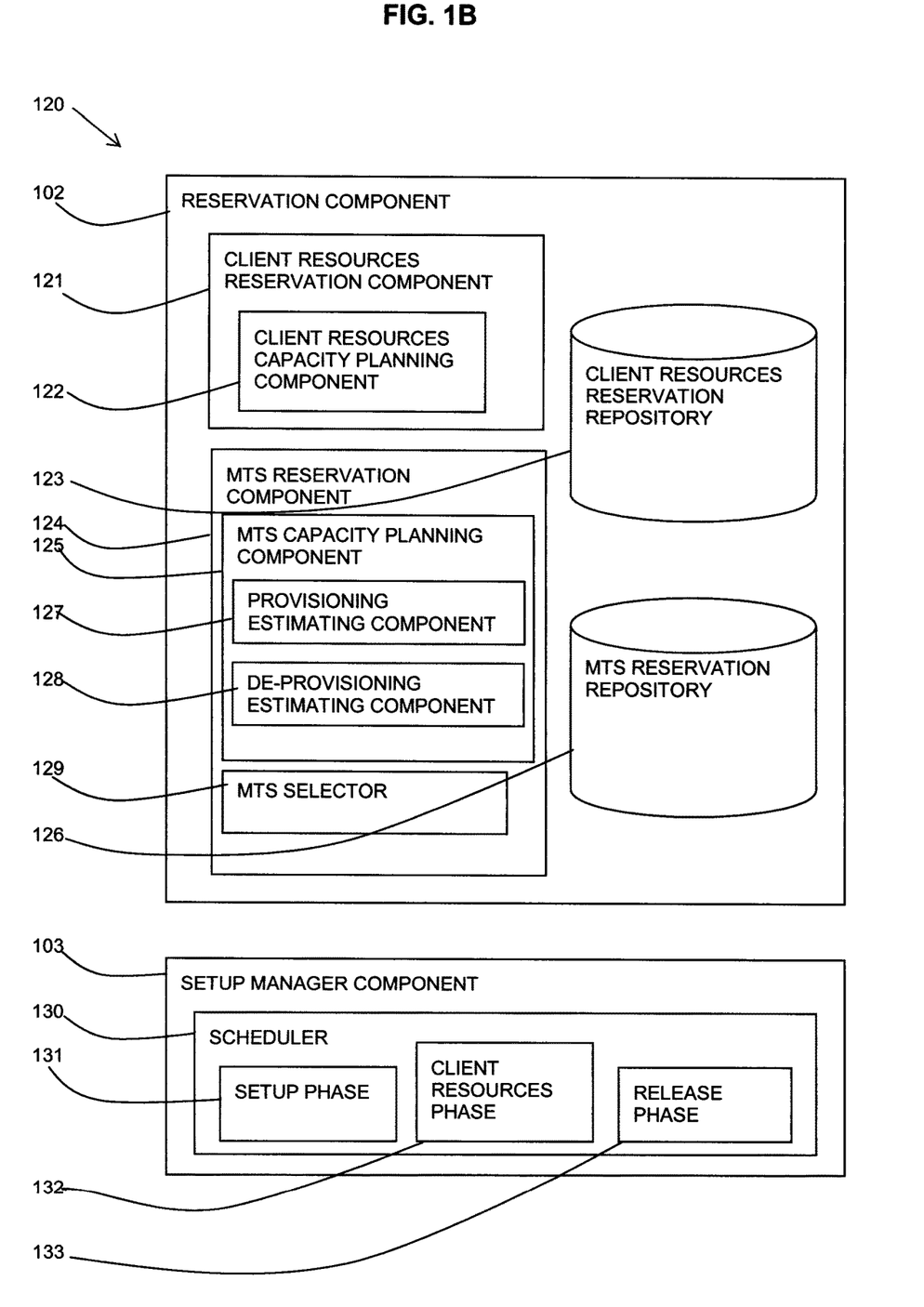

Referring to FIG. 1B, an example embodiment of a reservation system 120, including a reservation component 102 and a setup manager component 103, is shown in more detail.

The setup manager component 103 may be an engine to execute deployment requests based on scheduling information coming from the reservation component 103. In one embodiment, this may be integrated into the reservation component 102.

The reservation component 102 may include a client resources reservation component 121 including client resources capacity planning component 122 and access to a repository of reservations of client resources 123.

In addition, a resource providing component (referred to herein as a managed through server (MTS)) reservation component 124 may be provided including a MTS capacity planning component 125 and access to a repository of reservations on MTS 126. The managed through server reservation component 124 may take into account the MTS availability during the provisioning and de-provisioning phases. The MTS capacity planning component 124 may include a provisioning estimating component 127 for estimating a provisioning time for requested resources, a de-provisioning estimating component 128 for estimating a de-provisioning time for requested resources, and a MTS selector 129 for selecting a suitable MTS to use based on capacity.

The reservation component 102 may be associated with a setup manager component 103. The reservation component 102 may book the resources required for a specified duration of each project. Once booked, it sends the information to the setup manager component 103.

Figure 2:
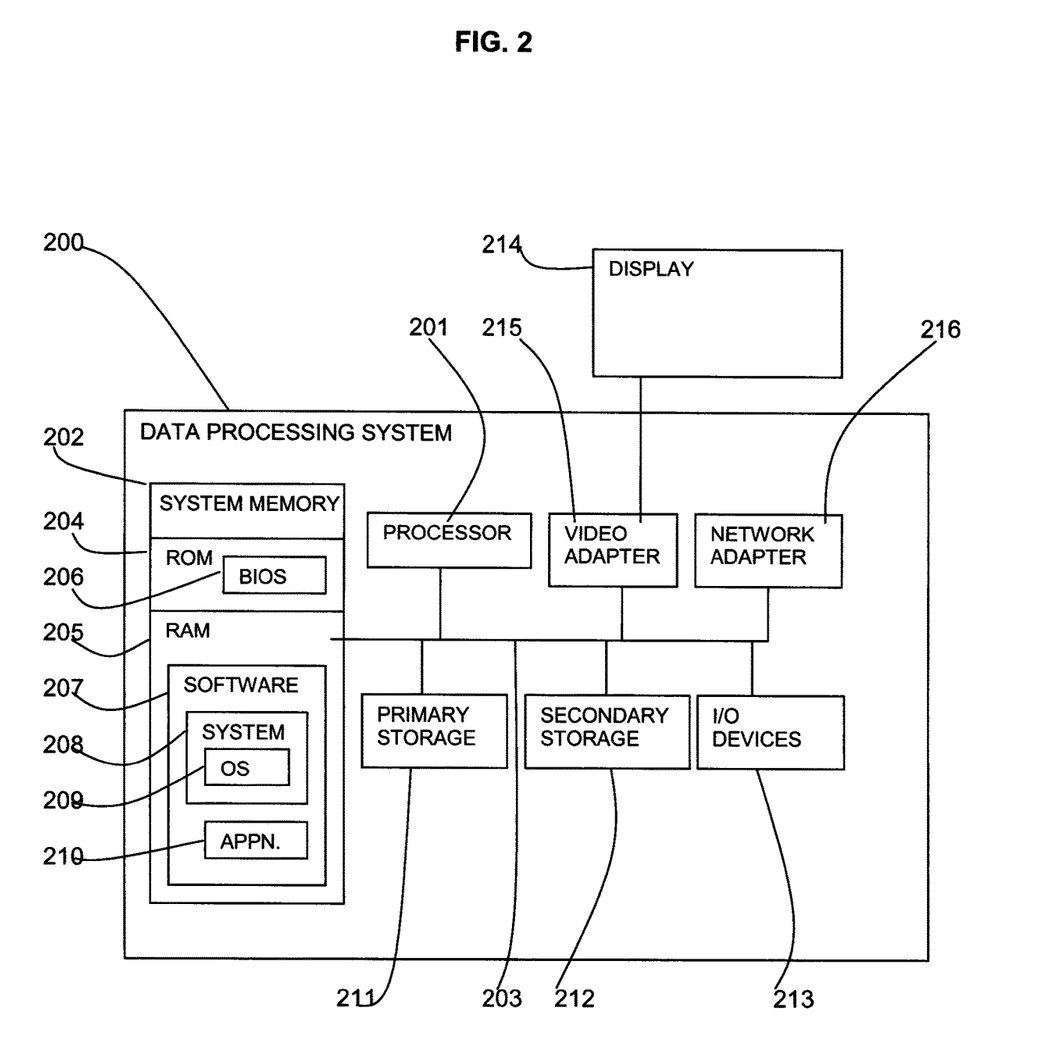
FIG. 2 is a block diagram of a computer system in which the present invention may be implemented.

The setup manager component 103 may use a scheduler 130 for scheduling a client resource phase 132 and, in addition, may schedule two MTS phases:

A setup phase 131 (provisioning): corresponding to a sequence of actions to execute in the environment to provision some resources. This action occurs at the project start date/time minus the evaluated time to setup all the resources required for the project;

A release phase 133 (de-provisioning): corresponding to a sequence of actions to de-provision or clean some resources. This action occurs at the project end date/time. Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
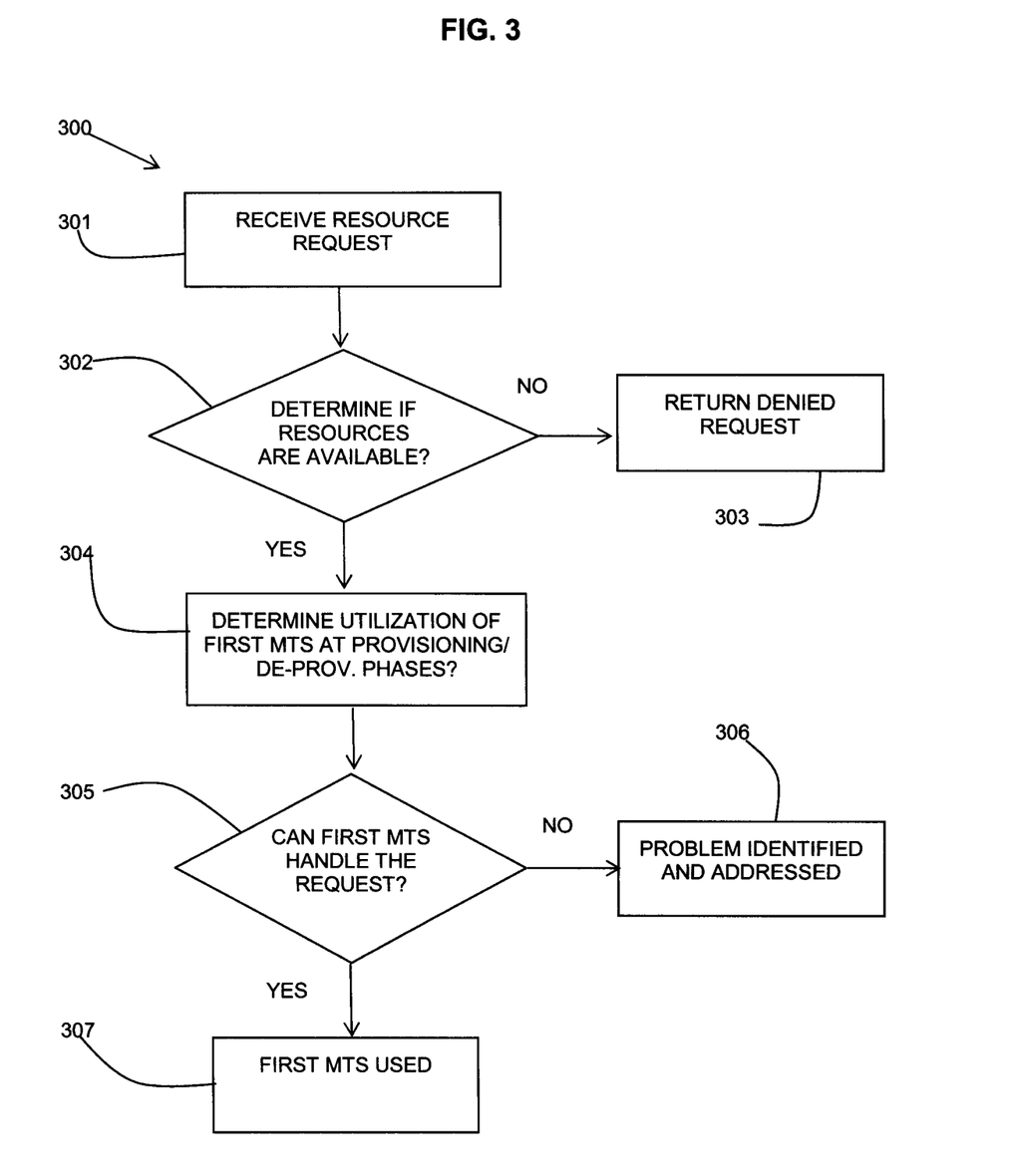
FIG. 3 is a flow diagram of an embodiment of a method in accordance with the present invention.

Referring to FIG. 3, a flow diagram 300 shows the described method for reserving resources used for executing a request so as to avoid bottlenecks at resource provisioning component such as a first managed through server.

A resource request may be received 301. The method may determine 302 whether requested resources are available at the requested time. If the requested resources are not available, the request will be denied 303.

The method may then determine 304 the utilization level of a first MTS, and optionally other MTSs, during the provisioning and de-provisioning phases. It may be determined 305 if a first MTS can handle the request. If it can handle the request, the first MTS may be used 307. If not, the problem has been identified 306 and may be addressed by using another MTS or by taking other action.

Figure 4:
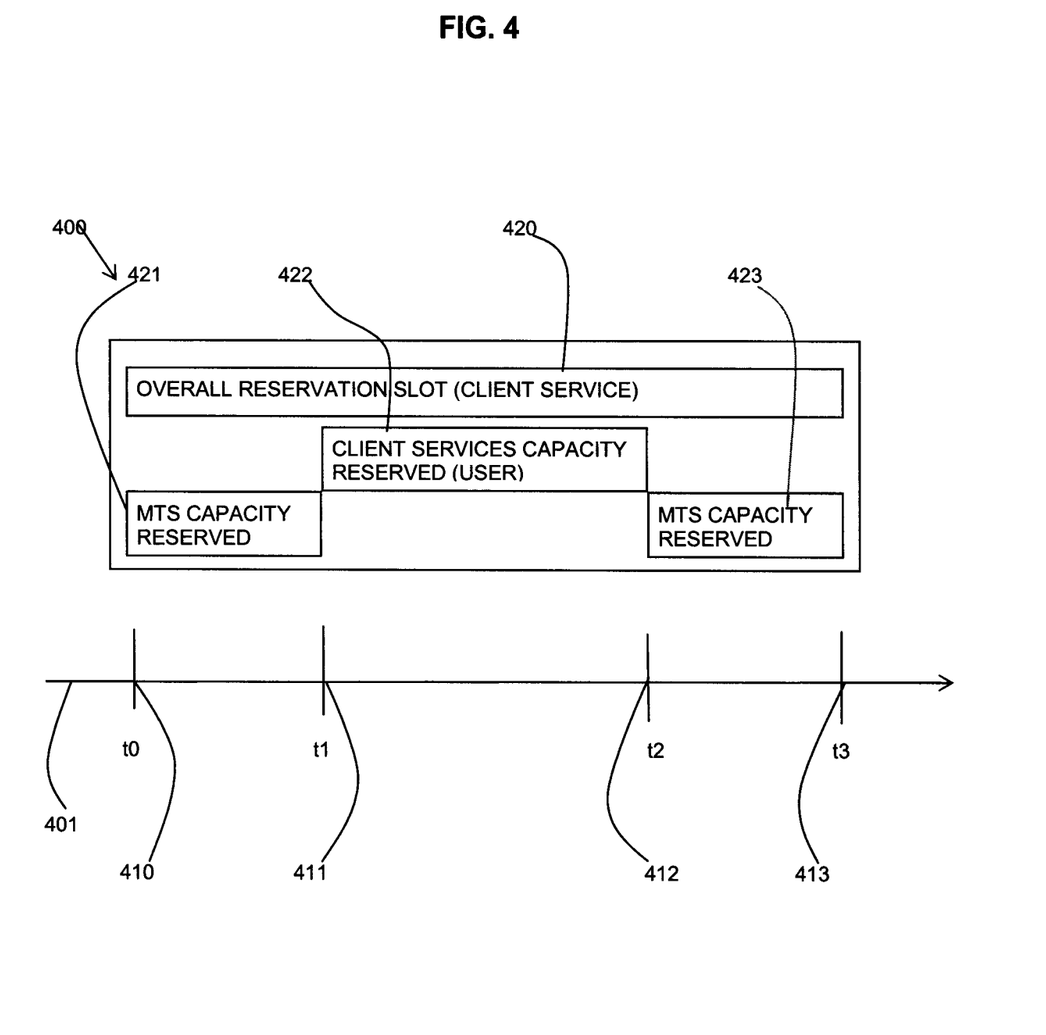
FIG. 4 is a flow diagram showing a reservation scenario in accordance with the present invention.

Referring to FIG. 4, a flow 400 in the described reservation component is shown along a time line 401.

Time t1 411 is a project start date as specified by a client making a reservation request. Time t0 410 is a time earlier than t1, and the time between t0 410 and t1 411 is required for provisioning of the MTS. Time t2 412 is the end date of the project, which is also the de-provisioning start. Time t3 413 is the de-provisioning end time.

A reservation component includes a client services capacity planning component and an MTS capacity planning component. The time period from t0 410 to t1 411 has MTS capacity 421 reserved for provisioning for the project. The time period from t1 411 to t2 412 has client services capacity 422 reserved for the project. The time period from t2 412 to t3 413 has MTS capacity 423 reserved for de-provisioning. Overall, a reservation slot 420 is provided for the project.

The client services capacity 422 required for the project is checked by the client services capacity planning component 122 (of FIG. 1B) of the reservation component 102 by checking the client resources reservation repository 123. The MTS capacity required for provisioning 421 and de-provisioning 423 is checked by the MTS capacity planning component 125 of the reservation component 102 by checking the MTS reservation repository 126.

The additional reservation of MTS capacity takes into account the required MTS availability during the provisioning and de-provisioning phases. The available capacity of client services is then reserved with MTS considerations.

Figure 5:
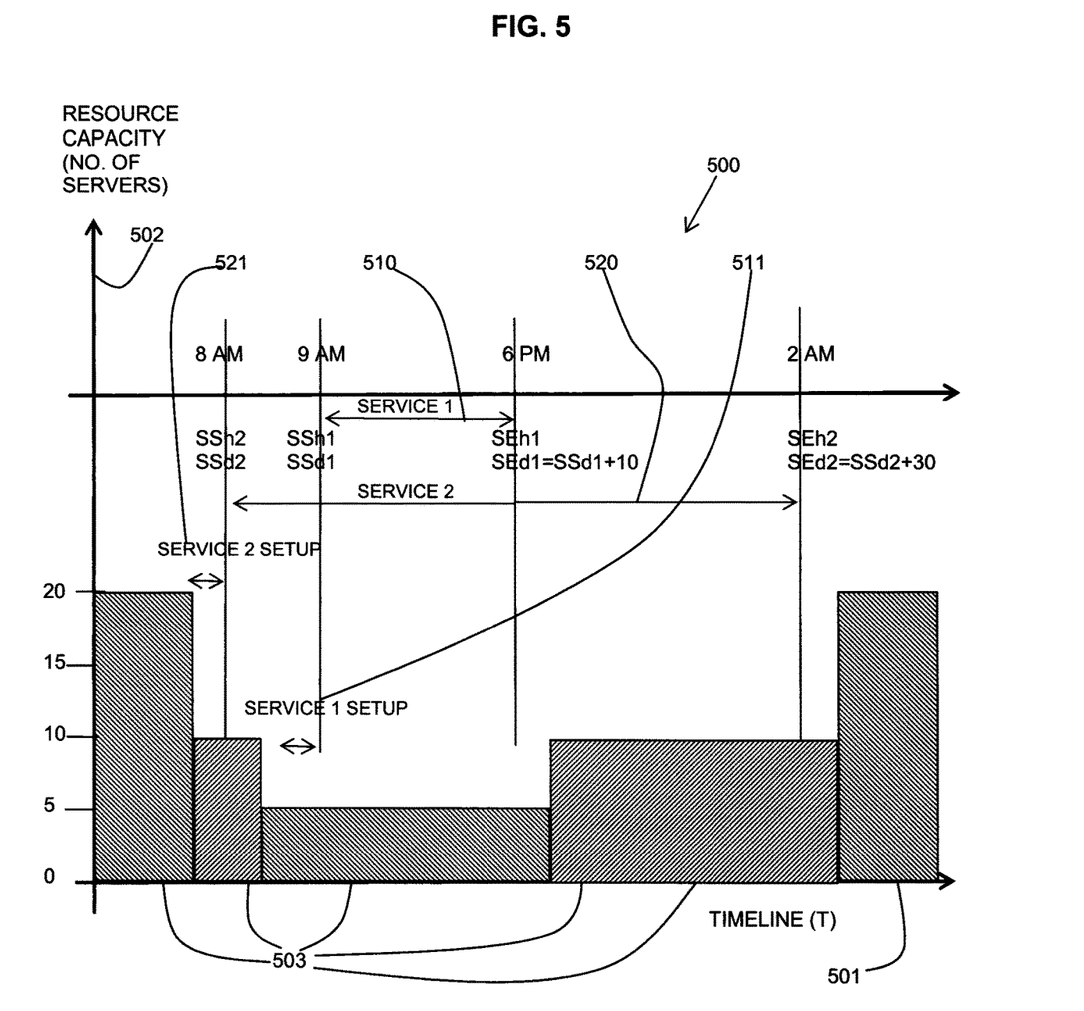
FIG. 5 is a graph showing resource capacity versus time in a reservation scenario as addressed by the present invention.

Referring to FIG. 5, a graph 500 shows a timeline (t) 501 against resource pool capacity 502. The time line illustrates the time periods and is not an exact scale. An example case is described for illustration. The available client resources as viewed by the reservation component are shown by blocks 503.

A first client books a first service 510 for a "platform as a service" for tomorrow morning for 10 days in order to host a new web site for energy consumption reports. He is requesting 5 virtual servers.

This service request is:
Created at 4 PM today;
Start date (SSd1) of the project is set to tomorrow at 9 AM (SSh1);
End date (SEd1) of the project is set to "tomorrow+10 Days" at 6 PM;
The request has a service setup time 511 to automatically create the environment in 30 minutes including:
Create a virtual server on an hypervisor;
Install the operating system;
Configure the network and storage;
Install a software stack to host the application;
Create a network access to the service; and
Send connection information to the client.

A second client is requesting a second service 520 for a different service for tomorrow morning in order to get 10 virtual servers for its development team. There is a service setup time 521 for the second service.

This service request is:
Created at 10 PM today;
Start date (SSd2) of the project is set to tomorrow at 8 AM (SSh2);
End date (SEd2) of the project is set to "tomorrow+30 Days" at 2 AM.

It can be seen from FIG. 5, that when the second service 520 starts to be setup prior to 8 AM, the number of available resources drops by 10 servers. When the first service 510 is then set up prior to 9 AM, the available resources drops by a further 5 servers. At the end of the first service 510, after a short de-provisioning period, the number of available resources rises to 10 servers. At the end of the second service 520, after a short de-provisioning period, the number of available resources rises to the full 20 servers.

In this use case, operating system installation is focused on the following.
The creation of a virtual server requires the utilization of a hypervisor (for virtualization).
A boot server is used to deploy an operating system (or an image) onto this virtual server.
The following variables are used:
SRc{X}-/+: Service Request creation ("−" before service request creation/"+" after service request creation);
SSd{X}: Service Start date, SSh{X}: Service Start hour;
SEd{X}: Service End date, SEh{X}: Service End hour;
SSPd{X}: Service Start Provisioning date, SSPh{X}: Service Start Provisioning hour;
SEPd{X}: Service End Provisioning date, SEPh{X}: Service End Provisioning hour;

SSDd{X}: Service Start De-provisioning date, SSDh{X}: Service Start De-provisioning hour;

SEDd{X}: Service End De-provisioning date, SEDh{X}: Service End De-provisioning hour;

ResPoolCap(t): Customer Resource pool capacity (function of a time "t");

MTRPoolCap(t): Managed Through Resources pool capacity (function of a time 15 "t");

{X}=Service Request Number;

Estimated duration to generate the service instance (fixed): EstimateProv(t);

Estimated duration to destroy the service instance (fixed): EstimateDeProv(t).

The flows for the services requests may be as follows:

First service request {X}=1:

Estimated duration to generate the service (fixed): EstimateProv(t)=30 min;

The request is created today at 4 PM and the reservation engine will check the availability of the resources from tomorrow 9 AM to "tomorrow+10 days" 6 PM using its current view on the planning;

The reservation engine is checking if the resources (cpu, memory, disk) needed to deploy 5 virtual servers are available on the hypervisor.

Second service request {X}=2:

Estimated duration to generate the service (fixed): EstimateProv(t)=45 min;

The request is created at 10 PM and the reservation engine will check the availability of the resources from tomorrow 8 AM to "tomorrow+30 days" 2 AM using its current view on the planning;

The reservation engine is checking if the resources (cpu, memory, disk) needed to deploy 10 virtual servers are available on the hypervisor.

Use Case 1

Resource pool capacity assumptions:

Initial resource pool capacity on the hypervisor: 20 virtual servers. ResPoolCap(SRc1−)=20;

Capacity of the Managed Through Server to install I/operating systems. MTRPoolCap(SRc1−)=10.

After the First Request:

Remaining capacity on the pool: ResPoolCap(SRc1+)=15 virtual servers;

After the second request:

Remaining capacity on the pool: ResPoolCap(SRc2+)=5 virtual servers.

Figure 6:
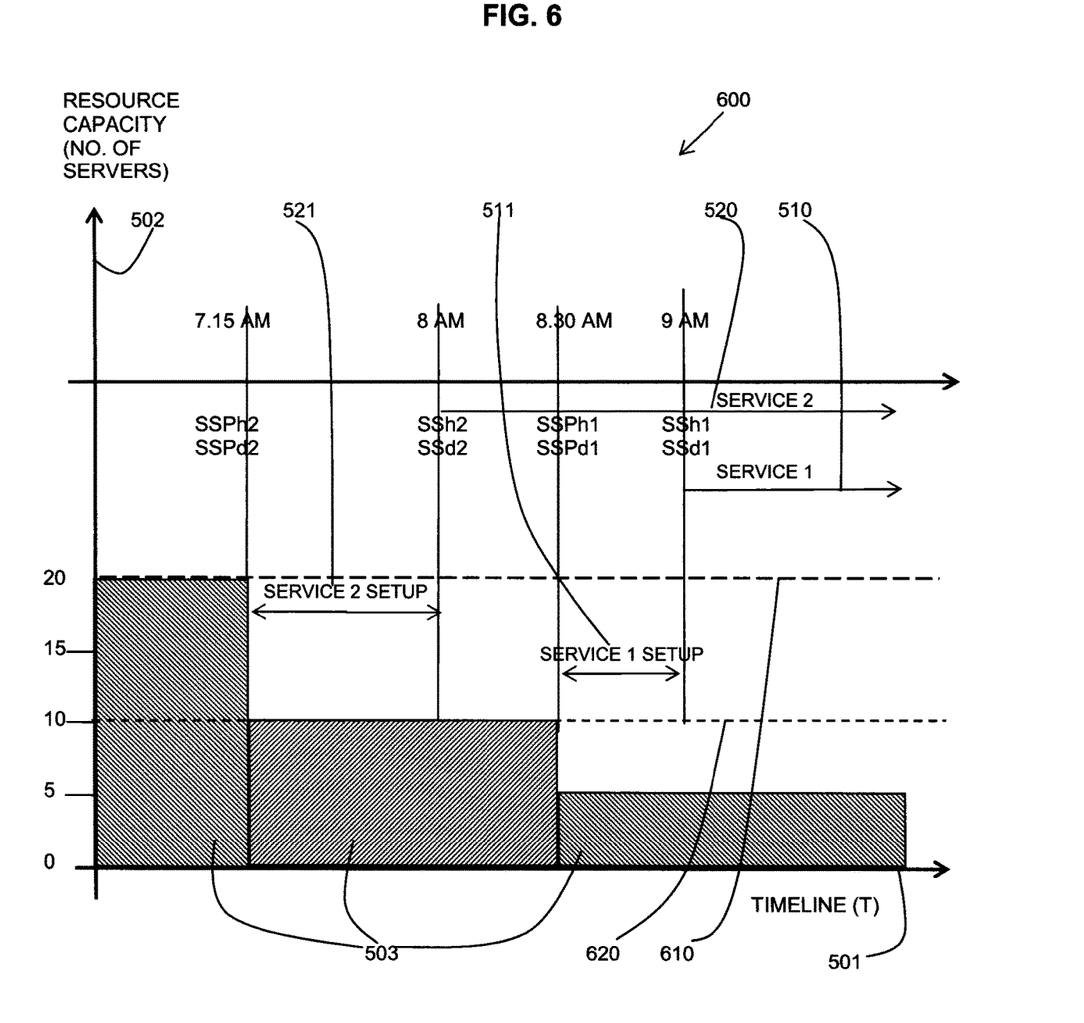
FIG. 6 is a detail of the graph of FIG. 5 showing a first use case.

FIG. 6 illustrates Use Case 1 as a detail 600 of the graph of FIG. 5 showing the setup period. The available client resources as viewed from a reservation component are shown by blocks 503. The long dashed line 610 shows the client resources capacity limit. The short dashed line 620 shows the MTS capacity limit.

The second service setup period 521 is shown running from 7.15 AM to 8 AM when the second service 520 starts. The first service setup period 511 is shown running from 8.30 AM to 9 AM when the first service 510 starts.

As shown in FIG. 6, there are enough resources in the resource pool to fulfill the two requests. The requests will be both accepted in the service portal for the end users.

Use Case 2

In this use case, one parameter is changed to estimate the duration to generate the first service request {X}=1 from 30 mins to 1 hour, 30 mins.

Figure 7:
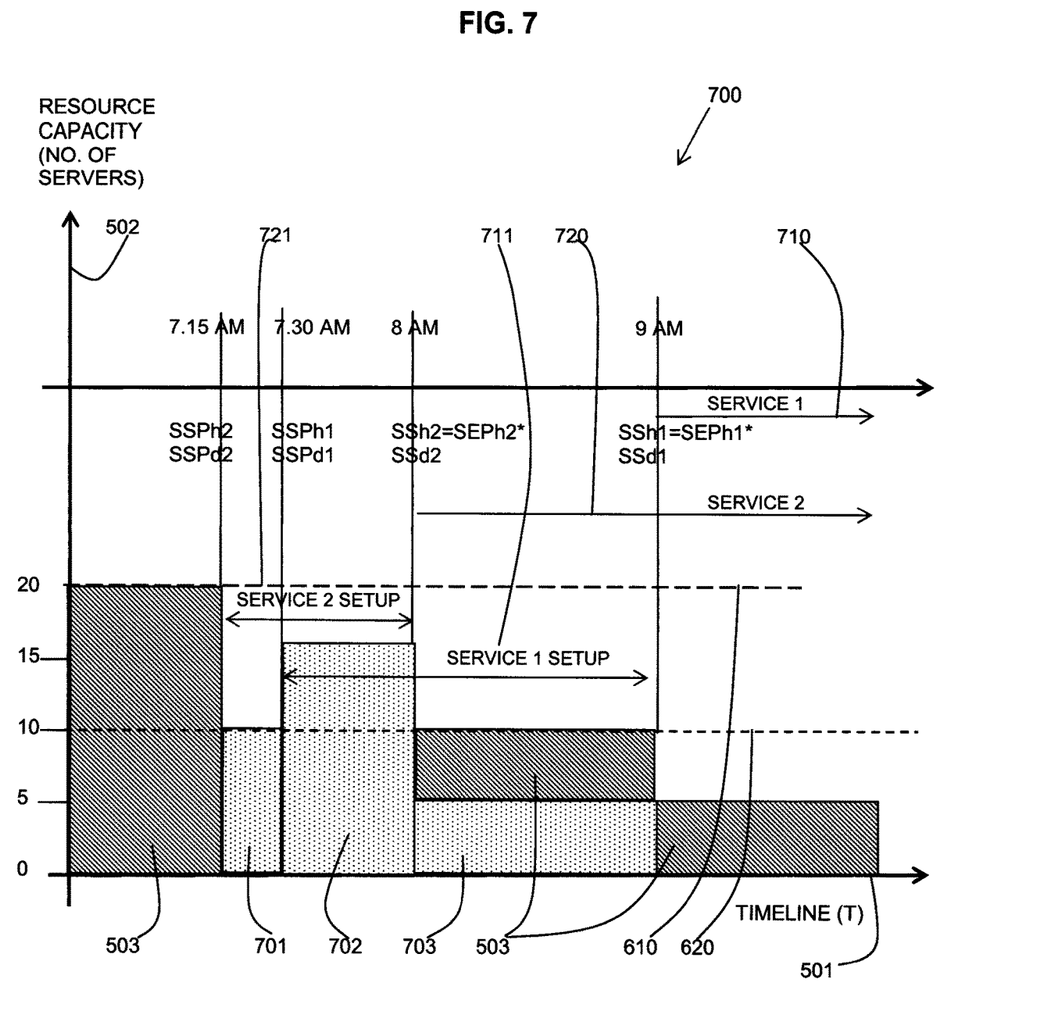
FIG. 7 is a detail of the graph of FIG. 5 showing a second use case.

Referring to FIG. 7, Use Case 2 is shown as a detail 700 of the graph of FIG. 5 showing the setup period. In FIG. 7, the utilization of MTS capacity is shown by dotted blocks 701-703, whilst the available client resources as viewed from a reservation component are shown by hashed blocks 503.

In FIG. 7, the first service 710 starts at 9 AM with a setup period 711 between 7:30 AM and 9 AM. The second service 720 remains as in FIG. 6 with a start at 8 AM and setup period 721 between 7:15 AM and 8 AM. So now in Use Case 2 the two service setup periods 711, 721 overlap.

The first dotted block 701 shows the utilization of MTS capacity as the second service 720 is setup 721 and uses 10 virtual servers for operating system installations in parallel. The second dotted block 702 shows that at 7:30 AM when the service setup period 711 of the first service 710 starts, an additional 5 virtual servers are needed for operating system installations in parallel. This is greater than the MTS capacity 620 shown by the dashed line of 10 virtual servers. Therefore, the MTS capacity is exceeded which will cause errors, problems, performance issues, conflicts, etc. At 8 AM, the second service setup 721 finishes and the dotted block 703 shows 5 virtual servers that are needed for the remainder of the first service setup 711.

This change to the setup period of the first services is not affecting the customer resource pool capacity. However, it presents the problem as shown in FIG. 7 of over-stretching the MTS capacity. In a conventional reservation system, the requests will be both accepted in the service portal but the second end-user will not have its service delivered correctly.

In the described method and system, the MTRPoolCap(t) function is used to represent the utilization of the Managed Through Resources capacity at a particular moment (t).

In the described reservation component, not only is the ResPoolCap(t) checked, to validate if there is availability of the resources requested by the end user, but in addition, the MTRPoolCap(t) value is considered during all the phases where a Managed Through Server is needed: in this case, the provisioning and de-provisioning phases.

Use case: Resource pool capacity assumptions.

Assumptions:

Initial resource pool capacity on the hypervisor: 20 virtual servers. ResPoolCap(SRc1−)=20

Capacity of the Managed Through Server to install I/operating systems.

MTRPoolCap(SRc1−)=10

After the First Request:

Remaining capacity on the pool: ResPoolCap(SRc1+)=15 virtual servers.

Reservation component controls:

Get MTRPoolCap(SSPh1,SEPh1) value;

Is MTRPoolCap(SSPh1,SEPh1)<MTRPoolCapMAX ?

Are there other deployments starting in the same slot as this request: SSPh1<SSPh{X}<SEPh1 or SSPh1<SEPh{X}<SEPh1

If No and MTRPoolCap(SSPh1,SEPh1) <MTRPoolCapMAX=>Request is accepted

If Yes and there are n values found:

Does $$\sum_{i=1}^{n} mtrPoolCap(SSPh\{i\}, SEPh\{i\}) < mtrPoolCapMAX$$

If Yes=> Request is accepted

If No=> Request is accepted (as the customer resource pool has some capacity available).

However, it is now known that the deployment will encounter an issue. This can be managed it in a smart way as presented below.

The following condition is assumed:
SSPh1<SEPh2<SEPh1

After the second request:
Remaining capacity on the pool: ResPoolCap(SRc2+)=5 virtual servers;
Smart booking method checks for MTRPoolCap(SSPh2, SEPh2)=10 OS in II;
MTRPoolCap(SSPh1, SEPh1)=5; MTRPoolCap-MAX=10;

This Gives:

$$\sum_{i=1}^{n} mtrPoolCap(SSPh\{i\}, SEPh\{i\}) > mtrPoolCapMAX$$

The described reservation method has detected a potential issue/problem for deploying the requests 1 and 2, so the deployment may be managed in a smarter way.

Thanks to the detection of a future problem during the 2nd end user request (in the example use case), the reservation component may now plan to push a part of the request to another managed through server which has enough capacity. As a view of the capacity of all the required MTS may be maintained, the work may be dispatched to a different MTS in order to guarantee the service delivery.

Figure 8A:
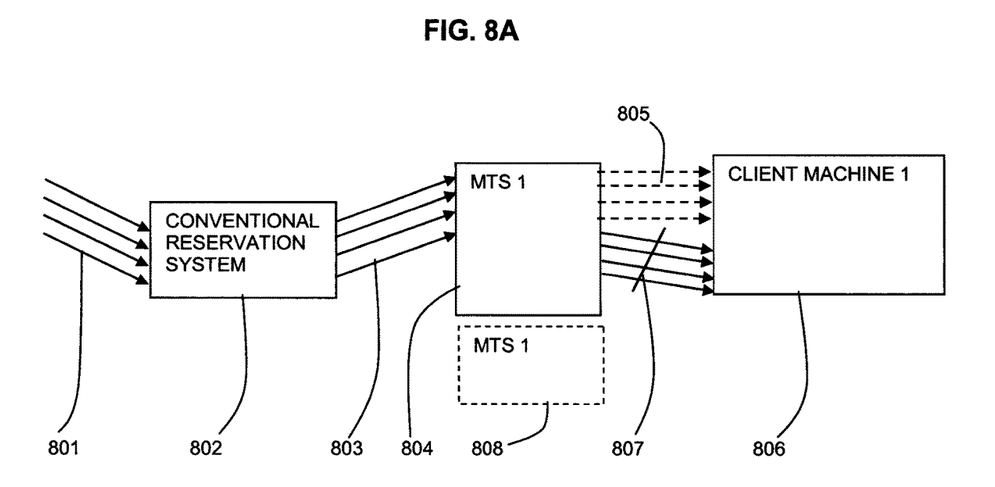
FIGS. 8A and 8B are block diagrams showing the service delivery in accordance with the present invention.

Referring to FIGS. 8A and 8B, an example service delivery scenario is illustrated. In FIG. 8A, a new end user request 801 is received at a conventional reservation system 802. The new deployments 803 are sent to a first MTS 804. The first MTS 804 has on-going deployments 805 on a client machine 806 and, therefore, it cannot handle the new deployments which result in failed requests 807, even through a second MTS 808 may be available with capacity for the deployments.

Figure 8B:
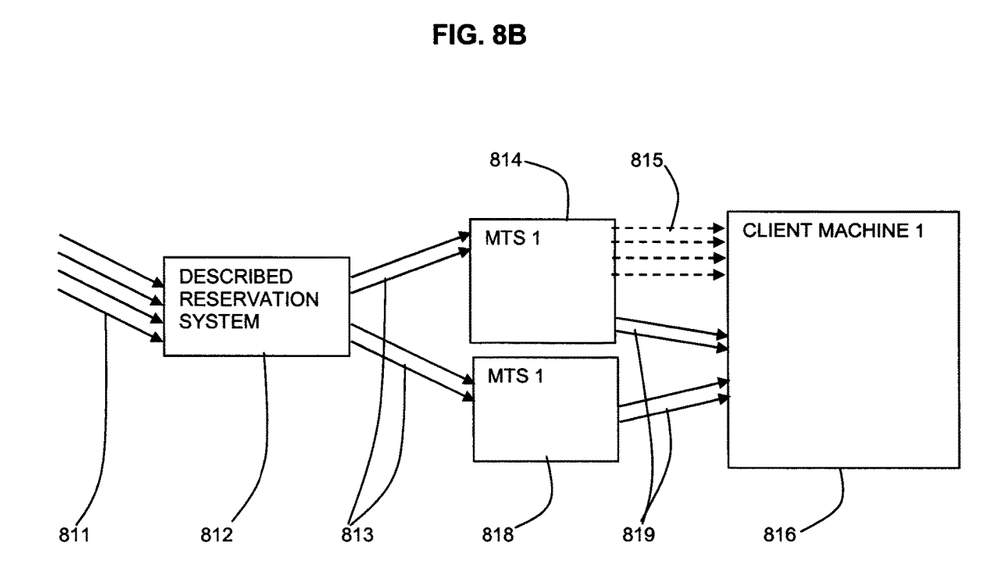

In FIG. 8B, the described method and system are used. A new end user request 811 is received at a described reservation system 812. The new deployments 813 are sent to two MTSs 814, 818 which have the required capacity to handle the deployments. Therefore, even though the first MTS 814 has on-going deployments 815 to a client machine 816, the new deployments 819 are handled successfully.

This proactive capability, during each phase of deployment may address many existing problems in infrastructure automated deployments. If another MTS is available for service deployment, the requests may be pushed to the 2nd MTS. If no other MTS is available, the reservation component may propose a different time slot to the end user by delaying the deployments onto the available MTS. For example, in FIG. 7, "Use Case 2: A longer setup time for request 1", a 30 minutes overlap is seen. The system can then propose a start date for the 2nd request at 7:30 PM instead of 8 PM, thus solving the issue a traditional system will have faced.

Using the described solution allows resources to be kept track of that were previously not taken into account during provisioning or de-provisioning which may help avoid errors in specific scenarios:

MTS capacity is monitored thus avoiding too many deployment requests processed concurrently;

Optimization of the allocation plan for reservation of resources by ensuring that the effective delivery of the requested service will be possible by the service underlying components;

Selection of the most appropriate MTS for the deployments; and

Ensuring that the infrastructure requested will be available at the time requested.

Another advantage is its capability to avoid errors (as the number of parallel requests is controlled) during deployments phases (provisioning or de-provisioning). Such errors are a main cause of the operational costs as several people must be involved to resolve the issues.

It also allows a better scalability of a service within an infrastructure by leveraging existing reservation mechanisms in different organization/industry.

A reservation system may be provided as a service to a customer over a network.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-implemented method for reservation of resources for implementing a service within a distributed networking system, comprising:

receiving a request, indicating a project duration having a start time and an end time, for a resource;

determining, using a hardware processor, that the requested resource is available for the project duration;

determining a utilization level, during a provisioning time prior to the start time of the project, of at least one resource provisioning component;

determining that the at least one resource provisioning component has capacity, prior to the start time of the project, to handle provisioning the resource for the request; and reserving, for a provisioning time prior to the start time of the project, the at least one resource provisioning component, wherein the resource is used to implement the service within the distributing network system and is deployed by the at least one resource provisioning component, and the at least one resource provisioning component is a hardware component that is configured to deploy the resource.

2. The method of claim 1, wherein
the determining that the at least one resource provisioning component has capacity includes
determining, upon a determination that a first resource provisioning component does not have capacity to handle provisioning the resource for the request, determining that a second resource provisioning component has capacity, prior to the start time of the project, to handle provisioning the resource for the request.

3. The method of claim 1, further comprising
estimating a provisioning time needed for the at least one resource provisioning component to provision the requested resource.

4. The method of claim 1, further comprising
estimating a de-provisioning time needed for the at least one resource provisioning component to de-provision the requested resource.

5. The method of claim 1, wherein
the at least one provisioning component is managed through a virtual server on a client machine.

6. A computer hardware system configured to reserve resources for implementing a service within a distributed networking system, comprising:
a hardware processor configured to execute the following operations:
receiving a request, indicating a project duration having a start time and an end time, for a resource;
determining that the requested resource is available for the project duration;
determining a utilization level, during a provisioning time prior to the start time of the project, of at least one resource provisioning component;
determining that the at least one resource provisioning component has capacity, prior to the start time of the project, to handle provisioning the resource for the request; and
reserving, for a provisioning time prior to the start time of the project, the at least one resource provisioning component, wherein
the resource is used to implement the service within the distributing network system and is deployed by the at least one resource provisioning component, and
the at least one resource provisioning component is a hardware component that is configured to deploy the resource.

7. The system of claim 6, wherein
the determining that the at least one resource provisioning component has capacity includes
determining, upon a determination that a first resource provisioning component does not have capacity to handle provisioning the resource for the request, determining that a second resource provisioning component has capacity, prior to the start time of the project, to handle provisioning the resource for the request.

8. The system of claim 6, wherein the hardware processor is further configured to execute the following operation
estimating a provisioning time needed for the at least one resource provisioning component to provision the requested resource.

9. The system of claim 6, wherein the hardware processor is further configured to execute the following operation
estimating a de-provisioning time needed for the at least one resource provisioning component to de-provision the requested resource.

10. The system of claim 6, wherein
the at least one provisioning component is managed through a virtual server on a client machine.

11. A computer program product, comprising
a computer readable hardware storage device having stored therein program code,
the program code, which when executed by a computer hardware system for reservation of resources for implementing a service within a distributed networking system, causes the computer hardware system to perform:
receiving a request, indicating a project duration having a start time and an end time, for a resource;
determining that the requested resource is available for the project duration;
determining a utilization level, during a provisioning time prior to the start time of the project, of at least one resource provisioning component;
determining that the at least one resource provisioning component has capacity, prior to the start time of the project, to handle provisioning the resource for the request; and
reserving, for a provisioning time prior to the start time of the project, the at least one resource provisioning component, wherein
the resource is used to implement the service within the distributing network system and is deployed by the at least one resource provisioning component, and
the at least one resource provisioning component is a hardware component that is configured to deploy the resource.

12. The computer product of claim 11, wherein
the determining that the at least one resource provisioning component has capacity includes
determining, upon a determination that a first resource provisioning component does not have capacity to handle provisioning the resource for the request, determining that a second resource provisioning component has capacity, prior to the start time of the project, to handle provisioning the resource for the request.

13. The computer product of claim 11, wherein the hardware processor is further configured to execute the following operation
estimating a provisioning time needed for the at least one resource provisioning component to provision the requested resource.

14. The computer product of claim 11, wherein the hardware processor is further configured to execute the following operation
estimating a de-provisioning time needed for the at least one resource provisioning component to de-provision the requested resource.

15. The computer product of claim 11, wherein
the at least one provisioning component is managed through a virtual server on a client machine.

* * * * *